US 8,014,780 B2

(12) United States Patent  
Huotari

(10) Patent No.: US 8,014,780 B2
(45) Date of Patent: Sep. 6, 2011

(54) METHOD FOR TRANSMITTING THE IDENTITY OF A CALLING SUBSCRIBER TO A CALLED SUBSCRIBER IN A MOBILE COMMUNICATION SYSTEM

(75) Inventor: Seppo Huotari, Espoo (FI)

(73) Assignee: Nokia Corporation, Espoo (FI)

( * ) Notice: Subject to any disclaimer, the term of this patent is extended or adjusted under 35 U.S.C. 154(b) by 954 days.

(21) Appl. No.: 11/783,177

(22) Filed: Apr. 6, 2007

(65) Prior Publication Data

US 2007/0184822 A1   Aug. 9, 2007

Related U.S. Application Data

(63) Continuation of application No. 08/983,318, filed as application No. PCT/FI97/00298 on May 20, 1998, now abandoned.

(30) Foreign Application Priority Data

May 20, 1996 (FI) .......................................... 962128

(51) Int. Cl.
*H04W 4/00* (2009.01)
*H04W 40/00* (2009.01)
*H04W 36/00* (2009.01)
(52) U.S. Cl. ................... 455/445; 455/433.1; 455/432.1
(58) Field of Classification Search ............... 455/432.1, 455/433, 435.1, 445, 403, 435, 1
See application file for complete search history.

(56) References Cited

U.S. PATENT DOCUMENTS

| 5,063,588 | A | * | 11/1991 | Patsiokas et al. ............... 340/7.1 |
| 5,400,390 | A | | 3/1995 | Salin |
| 5,504,804 | A | | 4/1996 | Widmark et al. |
| 5,506,888 | A | | 4/1996 | Hayes et al. |
| 5,511,111 | A | | 4/1996 | Serbetcioglu et al. |
| 5,526,400 | A | | 6/1996 | Nguyen |
| 5,537,457 | A | | 7/1996 | Lantto et al. |
| 5,557,655 | A | | 9/1996 | Latto |
| 5,561,840 | A | | 10/1996 | Alvesalo et al. |

(Continued)

FOREIGN PATENT DOCUMENTS

JP            06-291849          10/1994

(Continued)

OTHER PUBLICATIONS

"European digital cellular telecommunications system (Phase 2); Line identification supplementary services—Stage 1 (GSM 02.81)", European Telecommunication Standard, ETS 300 514, Sep. 1994, 20 pgs.

*Primary Examiner* — Tilahun Gesesse
(74) *Attorney, Agent, or Firm* — Harrington & Smith

(57) ABSTRACT

The invention relates to a method and a mobile communication system for transmitting the identity of a calling subscriber to a called subscriber in a mobile communication system comprising a home location register for permanent storage of subscriber data on mobile stations registered in the network, and at least one visitor location register for temporary storage of subscriber data on mobile stations located in the geographical area monitored by the visitor location register. The identity of subscriber A is transmitted to the mobile services switching center of subscriber B via signaling that is unrelated to the speech connection.

7 Claims, 3 Drawing Sheets

U.S. PATENT DOCUMENTS

| | | | |
|---|---|---|---|
| 5,600,705 A * | 2/1997 | Maenpaa | 455/433 |
| 5,711,006 A | 1/1998 | Brochu et al. | |
| 5,806,000 A | 9/1998 | Vo et al. | |
| 5,956,637 A * | 9/1999 | Ericsson et al. | 455/432.3 |
| 5,974,309 A * | 10/1999 | Foti | 455/412.1 |
| 6,002,931 A * | 12/1999 | Yamaguchi et al. | 455/433 |
| 6,078,804 A | 6/2000 | Alperovich et al. | |
| 6,167,264 A | 12/2000 | Palviainen et al. | |
| 6,505,047 B1 * | 1/2003 | Palkisto | 455/456.1 |
| 7,616,954 B2 * | 11/2009 | Jiang | 455/432.1 |
| 7,660,580 B2 * | 2/2010 | Jiang | 455/432.1 |
| 7,917,139 B2 * | 3/2011 | Jiang | 455/432.1 |

FOREIGN PATENT DOCUMENTS

| | | |
|---|---|---|
| JP | 8-154263 | 6/1996 |
| WO | WO 93/25050 | 12/1993 |
| WO | WO 94/21090 | 9/1994 |

* cited by examiner

1: Call from A routed to GMSC serving B
2: GMSC transmits A's identity and an inquiry about routing information to B's HLR
3: HLR transmits A's identity to B's VLR in a request for roaming number message
4: VLR transmits roaming number to HLR
5: HLR forwards roaming number to GMSC
6: Set-up message
2', 5', 6': Alternative route when A in same network as B's HLR ID# METHOD FOR TRANSMITTING THE IDENTITY OF A CALLING SUBSCRIBER TO A CALLED SUBSCRIBER IN A MOBILE COMMUNICATION SYSTEM This is a continuation of U.S. application Ser. No. 08/983,318, filed on Jan. 15, 1998, now abandoned which is the U.S. National Phase of International Application No. PCT/FI97/00298, filed on May 20, 1997, which relies for priority upon Finnish Application No. 962128, filed on May 20, 1996, the contents of all of which are hereby incorporated by reference in their entireties.

FIELD OF THE INVENTION

The invention relates to a method of transmitting the identity of a calling subscriber (subscriber A) to a called subscriber (subscriber B) in a mobile communication system comprising a home location register for permanent storage of subscriber data on mobile stations registered in the network, and at least one visitor location register for temporary storage of subscriber data on mobile stations located in the geographical area monitored by the visitor location register, whereby signalling that is unrelated to the speech connection is transmitted between the switching centres and registers of the mobile communication system.

The invention further relates to a mobile communication system comprising a home location register for permanent storage of subscriber data on mobile stations registered in the network, and at least one visitor location register for temporary storage of subscriber data on mobile stations located in the geographical area monitored by the visitor location register. Signalling that is unrelated to the speech connection is transmitted between the switching centres and registers of the mobile communication system.

BACKGROUND OF THE INVENTION

A service usually offered by present mobile communication systems is notification of the identity of the calling subscriber (subscriber A) to the called subscriber (subscriber B) during call set-up. This enables subscriber B to identify the caller before answering the call.

FIG. 1A in the attached drawing illustrates mobile $MS_B$ terminating call set-up in a GMS-type mobile communication system. The Figure only shows the relevant network elements as far as call set-up signalling is concerned. At point 1 a call initiated by subscriber is routed from the network of subscriber A (e.g. a mobile communication system PLMN or a public telephone network PSTN) to the Gateway MSC (GMSC) of the PLMN home network of subscriber B. The GMSC transmits an inquiry (message 2) about routing information to the home location register HLR of subscriber B. The subscriber data on the mobile station MS is permanently stored in the home location register HLR and temporarily in the visitor location register VLR in whose area the mobile station MS is located. During location update, information on the visitor location register VLR in whose area subscriber B is located is updated to the home location register HLR of subscriber B. In the example of FIG. 1A, subscriber B is located in another mobile communication network PLMN. At point 3, the home location register HLR transmits to the visitor location register VLR of subscriber B a request for a roaming number to the PLMN network to be visited. The visitor location register VLR reserves a Mobile Station Roaming Number (MSRN) and transmits the number to the home location register HLR in a reply message 4. The home location register HLR forwards the roaming number in message to the GMSC of the home PLMN which inquired about the routing information. On the basis of the roaming number, the GMSC can then route the call to the mobile services switching centre MSC of subscriber B in the PLMN network visited, if necessary via a transmitting transit network, as in FIG. 1A, in a set-up message G. Information on the identity of subscriber A is transmitted to subscriber B in a Calling Line Identity (CO field of the set-up message 6. The above kind of transmission of the calling subscriber identity is not always successful, e.g. when subscriber B is located in the area of another PLMN, as in FIG. 1A. Although call set-up is possible between different networks, all networks do not support the network signalling used in the transmission of the calling subscriber identity. In these cases the called subscriber is notified, in accordance with point 1.4 (version 4.4.1) of the recommendation GSM 02.81, that the CLI is not available.

SUMMARY OF THE INVENTION

It is an object of the present invention to enable transmission of the identity of a calling subscriber to subscriber B even if call set-up does not support transmission of calling subscriber identity, e.g. because subscriber B is located in the area of another network.

This new type of transmission of the identity of subscriber A is achieved with the method of the invention, which is characterized that the identity of subscriber A is transmitted to the mobile services switching centre of subscriber B via signalling that is unrelated to the speech connection.

The invention further relates to a mobile communication system described in the preamble, which, according to the invention, is characterized in that it is arranged to transmit the identity of subscriber A to the mobile services switching centre of subscriber B via signalling that is unrelated to the speech connection.

The invention is based on the idea that the subscriber identity is transmitted in signalling traffic between the switching centres and registers of the mobile communication system, preferably before a call is established.

The advantage of such a method for transmission of the identity of subscriber A is that the identity of subscriber A can be transmitted to subscriber B irrespective of the signalling protocols of the networks used for call set-up.

A further advantage of the invention is that the identity of subscriber A can be transmitted to subscriber B to the area of another network, e.g. abroad.

BRIEF DESCRIPTION OF THE DRAWINGS

In the following the invention will be described in greater detail with reference to the accompanying drawings, in which.

DETAILED DESCRIPTION OF THE INVENTION

The present invention can be applied to any mobile communication system. By way of example, the invention will be described below in connection with the pan-European digital mobile communication system GSM. As to a more detailed description of the GSM system, reference is made to GSM recommendations and the publication "The GSM System for Mobile Communications", M. Mouly & M. Pautet, Palaiseau, France, 1992, 1S8N:2-9507180-0-7.

Figure 1A:
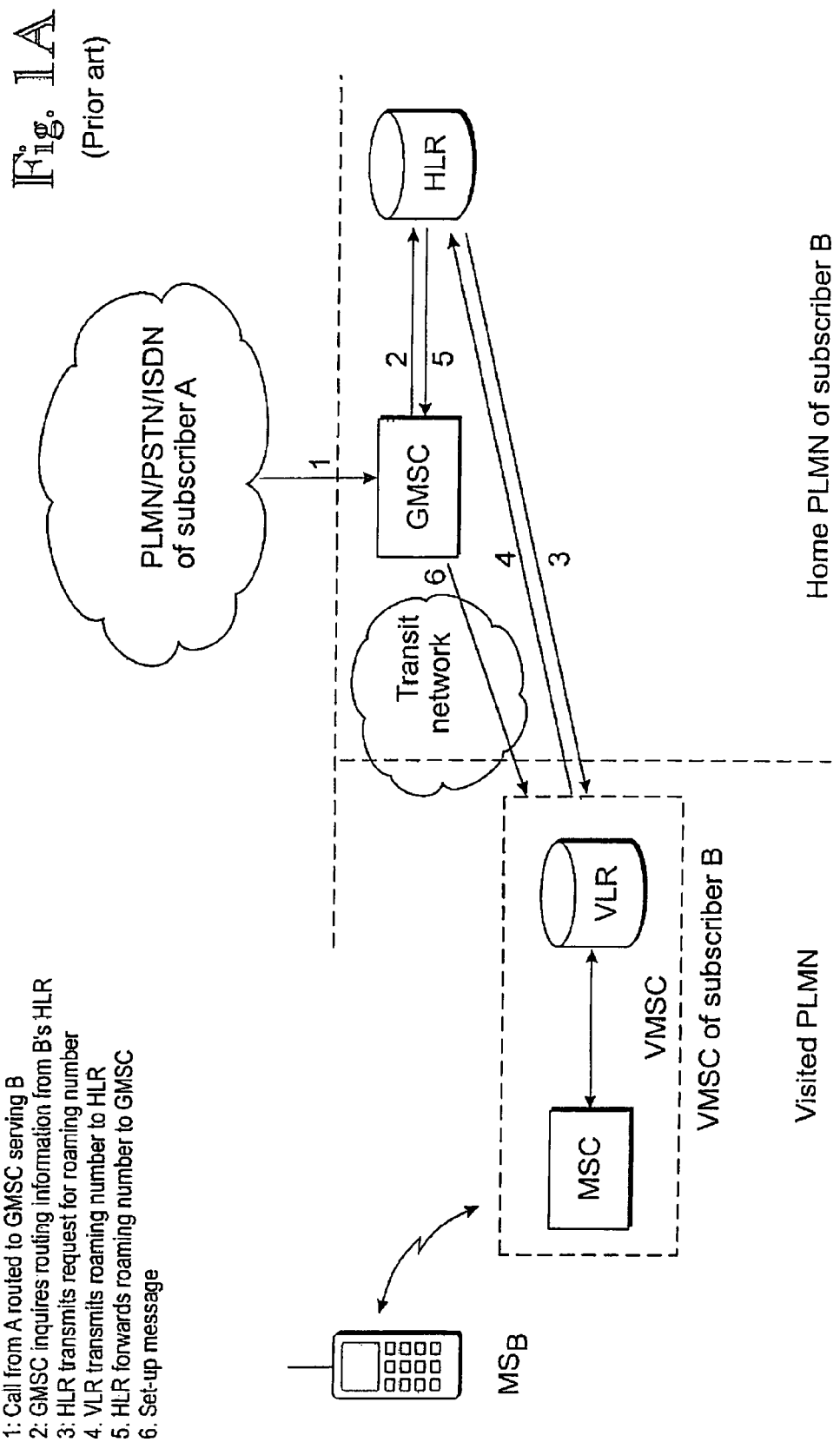
FIG. 1A illustrates call set-up in a GSM system.
Figure 1B:
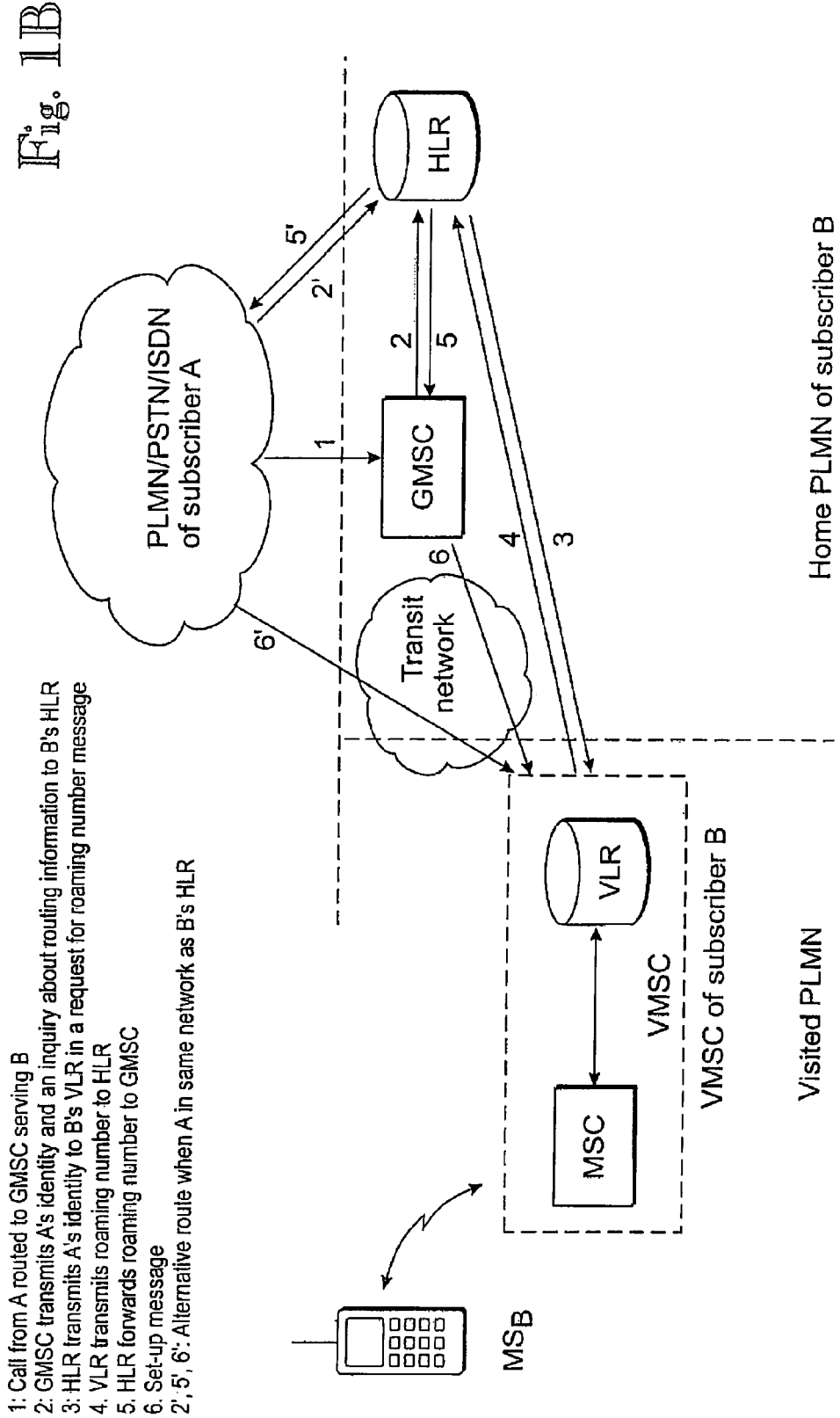
FIG. 1B illustrates call set-up in accordance with the invention.

FIG. 1B illustrates signalling associated with call set-up, previously described in connection with state-of-the-art call set-up. In the following the invention will be described in more detail by means of a preferred embodiment with reference to FIG. 1B. In this embodiment the transmission of subscriber A identity is associated with message 3 of FIG. 1B. Using MAP signalling of the GSM system, the home location register HLR transmits a roaming number request by a PROVIDE_ROAMING_NUMBER message to the visitor location register VLR. In the preferred embodiment of the invention, the identity of the calling subscriber, e.g. the phone number or the ISDN number, is added to the PROVIDE_ROAMING_NUMBER message, thus enabling identification of subscriber A. As to the other messages of FIG. 1B, call set-up in a mobile communication system utilizing the method of the invention conforms with the above described state-of-the-art technique.

Figure 2:
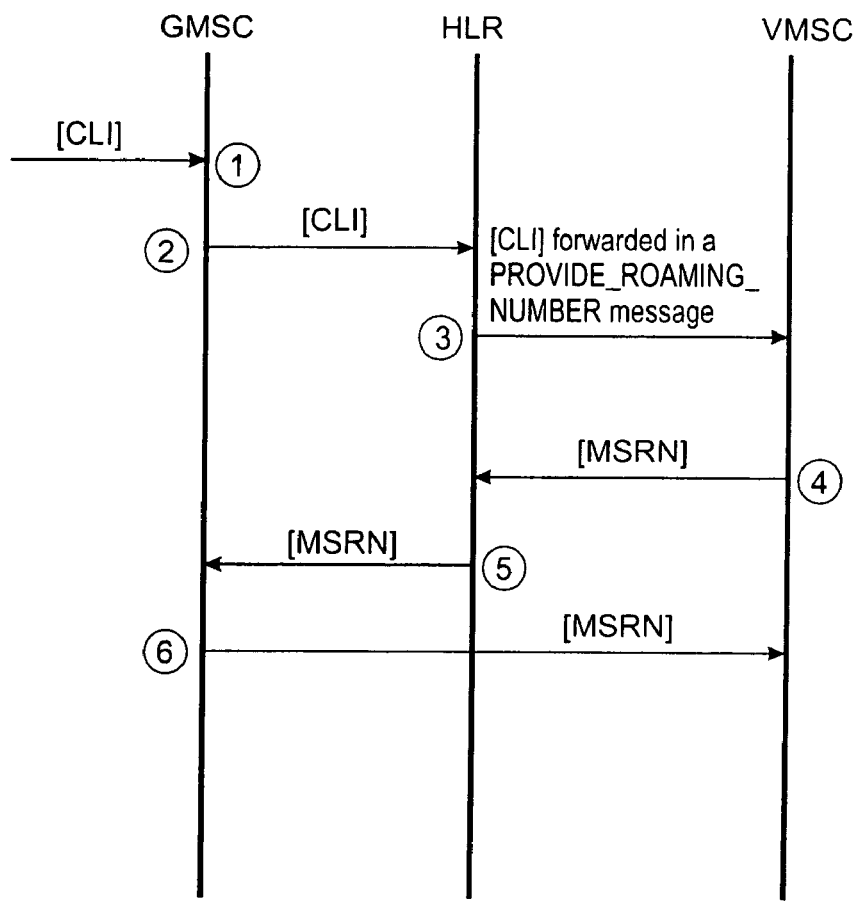
FIG. 2 shows transmission of subscriber A identity CLI according to the invention.

FIG. 2 illustrates the transmission of the CLI under call set-up according to the preferred embodiment of the invention. The calling subscriber (subscriber A) states his/her identity when initiating a call. At point 1 this information forwarded via the PLMN home network of subscriber B to the GMSC in a manner known per se. At point 2 the GMSC forwards the CLI to the home location register HLR of subscriber B, e.g. in connection with the inquiry about routing information. In accordance with the invention, at point 3 the PROVIDE_ROAMING_NUMBER message of the request for a roaming number forwards the CLI from the home location register HLR to the visitor location register VLR, which stores the CLI. In accordance with prior art, the visitor location register HLR answers the request for a roaming number by allocating a roaming number MSRN to the call and by transmitting it to the home location register HLR (point 4), which forwards the roaming number to the GMSC for routing of the call (point 5). Once the set-up message 6 arrives from the GMSC, possibly via a public telephone network or another transit network to the mobile services switching centre MSC of subscriber B in the PLMN network being visited, the MSC makes an inquiry about subscriber data to the visitor location register VLR and receives in the answer, among other things, the identity of subscriber A. The MSC forwards the identity of subscriber A to subscriber B in a manner known per se.

The invention has been described above by way of an example with reference to FIGS. 1B and 2, in a case when call set-up is carried out via the GMSC of the home network of subscriber B. When subscriber A is located in the same network as the home location register HLR of subscriber B, the call does not have to be routed via the GMSC of subscriber B. Neither is there any need for the GMSC of FIG. 1B if the switching centre of subscriber A or the gateway MSC of the network of subscriber A has the capacity to communicate directly with the home location register of subscriber B. In this case the call initiated by subscriber A does not have to be transmitted to the GMSC, but instead the switching centre of subscriber A, e.g. a mobile services switching centre, or the gateway MSC of the network of subscriber A transmits the routing inquiry direct to the home location register HLR of subscriber B (message 2' in FIG. 1B). The home location register HLR transmits a roaming number request to the visitor location register VLR in accordance with the above described embodiment of the invention by forwarding the identity of subscriber A in message 3. In a reply message 4 the home location register HLR gets a roaming number MSRN in accordance with the set-up signalling described above. The home location register HLR transmits to the switching centre of subscriber A or the network gateway MSC of subscriber A the roaming number MSRN reserved by the visitor location register VLR in message 5' of FIG. 1B. Having received this message, the switching centre or the network gateway MSC of subscriber A routes the call to the mobile services switching centre of subscriber B, possibly via a transit network.

Transmission of the identity of subscriber A according to the present invention is also applicable when both subscriber A and subscriber B are located in the home PLMN of subscriber B. A prerequisite for the use of the method of the invention is that the CLI has been transmitted to the home location register HLR of subscriber B.

The drawings and the description related thereto are only intended to illustrate the idea of the invention. The details of the mobile communication system and the method for transmitting the identity of subscriber A of the invention may vary within the scope of the claims. Even though the invention has been described above mainly in connection with MAP signalling, the method can be realized by utilizing other kinds of signalling between the mobile services switching centres and registers of a mobile communication system.

The invention claimed is:

1. A method of transmitting an identity of a calling subscriber to a mobile station assigned to a called subscriber, wherein the called subscriber is a mobile subscriber in a mobile communication system comprising switching centers for establishing a speech connection between a mobile station assigned to the calling subscriber and the mobile station assigned to the called subscriber, wherein one of the switching centers is associated with the mobile station assigned to the called subscriber, the method comprising:
    storing permanent subscriber data in a home location register and storing temporary subscriber data in a visitor location register, and
    transmitting the identity of the calling subscriber to the switching center associated with the mobile station assigned to the called subscriber from the home location register in connection with a request for routing information, wherein the transmitting further comprises using MAP signaling of the mobile communication system, the home location register transmitting a roaming number request message to the visitor location register, wherein the identity of the calling subscriber is added to the roaming number request message.

2. A method according to claim 1, further comprising transmitting the identity of the calling subscriber to the switching center associated with the mobile station assigned to the called subscriber in a MAP PROVIDE_ROAMING_NUMBER message.

3. A mobile communication system comprising:
    switching centers for establishing a speech connection between a mobile station assigned to a calling subscriber and a mobile station assigned to a called subscriber, wherein one of the switching centers is associated with the mobile station assigned the called subscriber,
    a home location register for permanent storage of subscriber data, and
    at least one visitor location register for temporary storage of subscriber data on subscribers located in a geographical area monitored by the visitor location register,
    transmitting means for transmitting an identity of the calling subscriber to the switching center associated with the mobile station assigned to the called subscriber from the home location register in connection with a request for routing info information, wherein the transmitting further comprises using MAP signaling of the mobile communication system, the home location register transmitting a roaming number request message to the visitor location register, wherein the identity of the calling subscriber is added to the roaming number request message.

4. A combination of a visitor location register plus mobile switching center comprising:
   a first interface toward a gateway switching center for receiving a request to establish a speech connection between a mobile station assigned to a calling subscriber and a mobile station assigned to a called subscriber,
   a second interface toward a home location register for receiving an identity of the calling subscriber from the home location register in connection with a request for routing information relating to the mobile station assigned to the called subscriber, the second interface being located at the visitor location register; and
   a third interface toward the mobile station assigned to the called subscriber for establishing the requested speech connection between the mobile station assigned to the calling subscriber and the mobile station assigned to the called subscriber, and for transmitting the identity of the calling subscriber obtained from the home location register to the mobile station assigned to the called subscriber, wherein the transmitting further comprises using MAP signaling of a mobile communication system, the home location register transmitting a roaming number request message to the visitor location register, wherein the identity of the calling subscriber is added to the roaming number request message.

5. A combination of a visitor location register plus mobile switching center according to claim 4, wherein the second interface is operable to receive the identity of the calling subscriber in a MAP PROVIDE ROAMING_NUMBER message.

6. A home location register for permanent storage of subscriber data in a mobile communication system, the mobile communication system comprising switching centers for establishing a speech connection between a mobile station assigned to a calling subscriber and a mobile station assigned to a called subscriber, wherein one of the switching centers is associated with the mobile station assigned to the called subscriber;
   the home location register comprising:
   a first interface toward a network element serving the mobile station assigned to the calling subscriber for receiving an identity of the calling subscriber;
   a second interface toward a combination of a visitor location register plus mobile switching center for requesting routing information relating to the mobile station assigned to the called subscriber and for transmitting the identity of the calling subscriber to said combination of a visitor location register plus mobile switching center in connection with a request for routing information, wherein the transmitting further comprises using MAP signaling of the mobile communication system, the home location register transmitting a roaming number request message to the visitor location register, wherein the identity of the calling subscriber is added to the roaming number request message.

7. A home location register according to claim 6, wherein the second interface is operable to transmit the identity of the calling subscriber in a MAP PROVIDE ROAMING_NUMBER message.

* * * * *